United States Patent
Kowalevicz et al.

(10) Patent No.: US 11,303,356 B1
(45) Date of Patent: Apr. 12, 2022

(54) METHODS AND APPARATUS FOR MAINTAINING RECEIVER OPERATING POINT WITH CHANGING ANGLE-OF-ARRIVAL OF A RECEIVED SIGNAL

(71) Applicant: RAYTHEON COMPANY, Waltham, MA (US)

(72) Inventors: Andrew Kowalevicz, Arlington, VA (US); Benjamin P. Dolgin, Alexandria, VA (US); Gary M. Graceffo, Burke, VA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 16/853,229

(22) Filed: Apr. 20, 2020

Related U.S. Application Data

(60) Provisional application No. 62/835,672, filed on Apr. 18, 2019.

(51) Int. Cl.
*H04B 10/00* (2013.01)
*H04B 10/112* (2013.01)
*H04B 10/54* (2013.01)

(52) U.S. Cl.
CPC ........... *H04B 10/112* (2013.01); *H04B 10/54* (2013.01)

(58) Field of Classification Search
CPC .............................. G02B 17/004; H04B 10/54
See application file for complete search history.

(56) References Cited

U.S. PATENT DOCUMENTS

| 5,896,005 | A | 4/1999 | Gurvitch et al. |
| 6,466,707 | B1 | 10/2002 | Dawes et al. |
| 6,816,315 | B1 | 11/2004 | Ai et al. |
| 7,158,281 | B2 | 1/2007 | Chen et al. |
| 7,711,441 | B2 | 5/2010 | Tillotson |
| 7,907,648 | B2 | 3/2011 | Matsui et al. |
| 8,427,649 | B2 | 4/2013 | Hays et al. |
| 8,929,408 | B1 | 1/2015 | Diels et al. |
| 9,091,853 | B2 | 7/2015 | Longeaud |

(Continued)

FOREIGN PATENT DOCUMENTS

| EP | 0426357 A2 | 5/1991 |
| JP | H06265832 A | 9/1994 |

(Continued)

OTHER PUBLICATIONS

International Search Report and Written Opinion in International Patent Application No. PCT/US2020/042160 dated Dec. 7, 2020.

(Continued)

*Primary Examiner* — David C Payne
*Assistant Examiner* — Pranesh K Barua
(74) *Attorney, Agent, or Firm* — Lando & Anastasi, LLP

(57) ABSTRACT

Methods and apparatus for maintaining transmitter-receiver alignment in a free space optical communications system without substantially moving the receiver element and with very little to no imparted momentum, while also allowing for higher tuning speeds and less system complexity than conventional solutions. The methods and apparatus allow for a large field of regard at the optical receiver, without the need for electromechanical gimbals to move the entire receiver unit and without the need for steering mirrors to move and align the incoming optical beam.

19 Claims, 6 Drawing Sheets

(56) References Cited

U.S. PATENT DOCUMENTS

| | | |
|---|---|---|
| 10,432,315 B2 | 10/2019 | Chen et al. |
| 2002/0030439 A1 | 3/2002 | Gurvitch et al. |
| 2002/0171908 A1 | 11/2002 | Copner et al. |
| 2004/0080832 A1 | 4/2004 | Singh |
| 2004/0080834 A1 | 4/2004 | Thompson |
| 2006/0182154 A1 | 8/2006 | Tanaka et al. |
| 2007/0076282 A1* | 4/2007 | Kourogi ............... G02F 1/0311 359/237 |
| 2007/0171504 A1 | 7/2007 | Fujimori |
| 2009/0210191 A1 | 8/2009 | Rogers et al. |
| 2010/0135670 A1 | 6/2010 | Amadeo et al. |
| 2010/0253948 A1 | 10/2010 | Strandjord et al. |
| 2011/0273758 A1* | 11/2011 | Wang ..................... G02F 1/21 359/260 |
| 2012/0147361 A1 | 6/2012 | Mochizuki et al. |
| 2013/0278933 A1 | 10/2013 | Nozawa |
| 2014/0240711 A1 | 8/2014 | Matsushita |
| 2014/0314406 A1 | 10/2014 | Zerbe et al. |
| 2016/0064894 A1 | 3/2016 | Takiguchi et al. |
| 2016/0209643 A1 | 7/2016 | Tsikouras et al. |
| 2016/0259185 A1 | 9/2016 | Osumi et al. |
| 2016/0349284 A1 | 12/2016 | Pradhan et al. |
| 2016/0357189 A1 | 12/2016 | Barrows et al. |
| 2016/0363648 A1 | 12/2016 | Mindell et al. |
| 2017/0299882 A1 | 10/2017 | New et al. |
| 2018/0054259 A1 | 2/2018 | Kowalevicz et al. |
| 2018/0091227 A1 | 3/2018 | Dolgin et al. |
| 2018/0091228 A1* | 3/2018 | Kowalevicz ............ G02B 5/28 |
| 2018/0091230 A1 | 3/2018 | Dolgin et al. |
| 2018/0091232 A1 | 3/2018 | Dolgin et al. |
| 2018/0102853 A1 | 4/2018 | Dolgin et al. |
| 2018/0145764 A1 | 5/2018 | Dolgin et al. |
| 2018/0145765 A1 | 5/2018 | Kowalevicz et al. |
| 2018/0167145 A1 | 6/2018 | Dolgin et al. |
| 2018/0212682 A1 | 7/2018 | Chen et al. |
| 2018/0234231 A1 | 8/2018 | Dolgin et al. |
| 2018/0275050 A1 | 9/2018 | Iguchi et al. |
| 2018/0367223 A1 | 12/2018 | Graceffo et al. |
| 2019/0007091 A1 | 1/2019 | Graceffo et al. |
| 2019/0064629 A1 | 2/2019 | Abouraddy et al. |
| 2019/0158208 A1 | 5/2019 | Dolgin et al. |
| 2019/0257990 A1* | 8/2019 | Hunter ................... H01S 5/146 |
| 2019/0331941 A1 | 10/2019 | Coolbaugh et al. |
| 2020/0278272 A1 | 9/2020 | Kasahara et al. |

FOREIGN PATENT DOCUMENTS

| | | |
|---|---|---|
| WO | 8500484 A1 | 1/1985 |
| WO | 2007016537 A2 | 2/2007 |

OTHER PUBLICATIONS

International Search Report and Written Opinion of International Patent Application No. PCT/US2020/028941 dated Sep. 23, 2020.

Invitation to Pay Additional Fees from the International Searching Authority in International Patent Application No. PCT/US2020/042160 dated Oct. 16, 2020.

International Search Report and Written Opinion of International Patent Application No. PCT/US2020/040751 dated Oct. 19, 2020.

Ball, D.W., "Field Guide to Spectroscopy," SPIE Press, Bellingham, WA (2006), https://spie.org/publications/fg08_p13_i ndex_of_refraction?SSO= 1.

* cited by examiner

METHODS AND APPARATUS FOR MAINTAINING RECEIVER OPERATING POINT WITH CHANGING ANGLE-OF-ARRIVAL OF A RECEIVED SIGNAL

CROSS-REFERENCE TO RELATED APPLICATION

This application claims priority under 35 U.S.C. § 119(e) to U.S. Provisional Application Ser. No. 62/835,672, titled "METHODS AND APPARATUS FOR MAINTAINING RECEIVER OPERATING POINT WITH CHANGING ANGLE-OF-ARRIVAL OF A RECEIVED SIGNAL," filed on Apr. 18, 2019, which is hereby incorporated by reference in its entirety.

BACKGROUND

Many optical communication systems manipulate light waves to carry information. For instance, often a light source (e.g., a laser source) is modulated to change various properties of emitted light, such as an amplitude, phase, or frequency of the light to convey information. An optical receiver may receive an demodulate the light waves to recover the information. For free-space optical communications, there is a need to be able to receive communication signals from different angles, either because the transmitter and receiver are not completely aligned to each other, or because there is relative movement between them. Mechanical gimbal solutions and beam-steering solutions with movable mirrors are used in some applications and are effective at maintaining transmitter/receiver alignment. However, both these types of implementations require mechanical rotation in one or more planes, which can increase size, weight, cost and complexity of a system. In addition, for these solutions, imparted momentum to the platform results, which can be problematic in some applications.

SUMMARY OF INVENTION

Aspects and embodiments are directed to methods and apparatus for maintaining transmitter-receiver alignment in a free space optical communications system without substantially moving the receiver element and with very little to no imparted momentum, while also allowing for higher tuning speeds and less system complexity than conventional solutions. Embodiments discussed below allow for a large field of regard at the optical receiver, without the need for electromechanical gimbals to move the entire receiver unit and without the need for steering mirrors to move and align the incoming optical beam.

One embodiment is directed to an optical receiver. The optical receiver includes an optical resonator assembly including at least one optical resonator configured to receive an input optical signal, to accumulate resonant optical signal energy inside the at least one optical resonator based at least in part on the input optical signal, and to produce an intensity modulated output optical signal, an intensity modulation of the output optical signal being representative of a modulation of the input optical signal. The optical receiver also includes a detector configured to detect the intensity modulated output optical signal and to identify the modulation of the input optical signal based at least in part on the intensity modulation of the output optical signal, and a controller coupled to the detector and to the optical resonator assembly. The controller is configured to provide a control signal to tune the at least one optical resonator to maintain a selected resonant condition of the at least one optical resonator over a range of angles of incidence of the input optical signal at the at least one optical resonator.

In one example, the at least one optical resonator is one of a Fabry-Perot etalon, a micro-ring resonator, a Fizeau interferometer, and a Michelson interferometer.

In another example, the at least one optical resonator includes: a first semi-reflective surface positioned to receive the input optical signal, a second semi-reflective surface positioned facing the first semi-reflective surface and arranged to emit the output optical signal, and a material interposed between the first semi-reflective surface and the second semi-reflective surface. The at least one optical resonator is configured to accumulate the resonant optical signal energy inside the at least one optical resonator and between the first semi-reflective surface and the second semi-reflective surface to approach a steady-state output value of the output optical signal, the intensity modulation of the output optical signal including a series of deviations from the steady-state output value. With this arrangement, the material is a piezoelectric material the controller is configured to apply the control signal to the piezoelectric material to tune an optical thickness of the at least one optical resonator.

In one example, the modulation of the input optical signal is phase modulation. With this arrangement, the controller is configured to monitor the output signal and to provide the control signal based on the detector identifying a deviation from steady state in the output optical signal as corresponding to a phase shift in the modulated input optical signal.

In another example, the intensity modulated output optical signal is one or more of a transmitted signal or a reflected signal from the optical resonator.

In one example, the at least one optical resonator is an etalon having a pair of semi-reflective surfaces configured to at least partially trap the resonant optical signal energy between the pair of semi-reflective surfaces by reflecting a portion of resonant optical signal energy between pair of semi-reflective surfaces. The etalon includes a material interposed between the pair of semi-reflective surfaces. With this arrangement, the material is a piezoelectric material, and wherein the controller is configured to apply the control signal to the piezoelectric material to tune an optical thickness of the at least one optical resonator.

In another example, the detector includes at least one optical-electrical converter configured to convert the output optical signal into an electrical signal. With this arrangement, the controller is configured to monitor at least one of the output optical signal and the electrical signal and to provide the control signal based on a characteristic of the monitored signal.

According to one embodiment, a method of maintaining an operating point of an optical receiver includes receiving a modulated input optical signal at an optical resonator, resonating optical signal energy within the optical resonator based at least in part on the input optical signal, emitting an output optical signal from the optical resonator, an intensity of the output optical signal being based at least in part on an intensity of accumulated resonant optical signal energy within the optical resonator, tuning the optical resonator to maintain a selected resonant condition of the optical resonator over a range of angles of incidence of the input optical signal at the optical resonator.

In one example of the method, the optical resonator is an etalon having a pair of semi-reflective surfaces configured to at least partially trap the resonant optical signal energy in a piezoelectric material disposed between the pair of semi-reflective surfaces by reflecting a portion of resonant optical signal energy between pair of semi-reflective surfaces. The tuning the optical resonator includes applying a control signal to the piezoelectric material to adjust an optical thickness of the optical resonator.

In another example, the method includes disturbing the intensity of the output optical signal in response to a variation in the input optical signal, the variation in the input optical signal corresponding to a modulation of the input optical signal, and identifying the modulation of the input optical signal based at least in part on detecting the disturbance in the intensity of the output optical signal. With this arrangement, the method includes monitoring the intensity of the output optical signal and tuning the optical resonator based at least in part on the intensity of the output optical signal. Further with this arrangement, the modulation of the input optical signal is phase modulation, and the selected resonance condition is maintained by tuning the optical resonator based on identifying a deviation from steady state in the monitored intensity of the output optical signal as corresponding to a phase shift in the modulated input optical signal.

In one example, the tuning includes tuning an optical thickness of the optical resonator, wherein the optical thickness is tuned by mechanically moving one of a pair of reflective surfaces of the optical resonator or adjusting a temperature of the optical resonator.

In another example, the optical resonator includes an electro-optical material connected to one or more electrodes, and the optical resonator is tuned by adjusting a voltage of the one or more electrodes to adjust an electric field within the optical resonator.

In one example, the emitted optical output signal is one or more of a transmitted signal or a reflected signal from the optical resonator.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Figure 1:
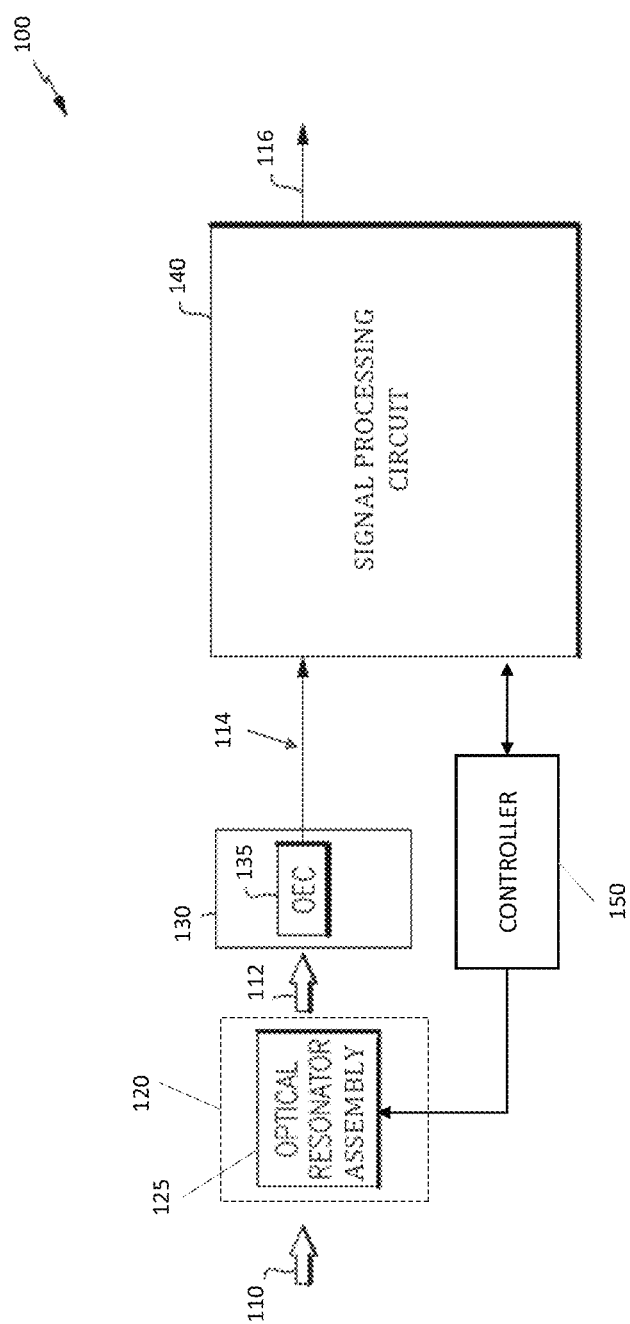
FIG. 1 is a functional block diagram of one example of an optical receiver according to certain aspects of the present invention.

Certain optical signal receivers include an optical resonator assembly, such as a Fabry-Perot resonator assembly, a micro-ring assembly, or a non-planar resonator assembly that is used to demodulate arriving optical signals. Using an optical resonator assembly in the demodulator may offer advantages over conventional demodulation techniques, including the ability to demodulate weak optical signals without a locally coherent clock source. The arriving optical signals may be phase modulated, amplitude modulated, or frequency modulated, or may be modulated using a combination of these techniques (e.g., QAM methods). In certain examples, the optical resonator assembly converts a received a phase, amplitude, or frequency modulated optical signal into a directly detectable intensity modulated output signal, as discussed further below. The optical resonator assembly may be sensitive to the angle of arrival of the incoming optical signal, and its output response signal may change as a function of that angle. Accordingly, aspects and examples described herein provide apparatuses, systems, and methods for maintaining a desired operating point of the optical resonator assembly as the angle of arrival of the incoming optical signal changes.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting.

Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation. The terms light, light signal, and optical signal may be used interchangeably herein and refer generally to an electromagnetic signal that propagates through a given medium, which may be empty space, e.g., a vacuum, or may be an atmospheric, e.g., air, or other medium, such as fiber or other optics components. The terms "light," "light signal," and "optical signal" are not meant to imply any particular characteristic of the light, such as frequency or wavelength, band, coherency, spectral density, quality factor, etc., and may include radio waves, microwaves, infrared, visible, and/or ultraviolet electromagnetic radiation, or other non-ionizing electromagnetic radiation conventionally processed in the field of optics.

FIG. 1 is a block diagram of one example of an optical receiver according to certain embodiments. The optical receiver 100 receives a modulated optical signal 110 transmitted along a free space signal path (e.g., free space optical, FSO), a fiber coupling, or another waveguide system from a transmitter (not shown). The optical receiver 100 includes a demodulator 120 that includes an optical resonator assembly 125, a detector assembly 130 including at least one optical-electrical converter (OEC) 135, and a signal processing circuit 140. In certain examples, the detector assembly 130 and the signal processing circuit 140 may be collectively referred to as a detector. The detector assembly 130 and the signal processing circuit 140 may be separate components or may be part of a common module. The optical resonator assembly 125 is positioned to receive the modulated optical signal 110 and to produce an output optical signal 112 that has characteristics representative of the modulation of the modulated optical signal 110, as discussed further below. The detector assembly 130 receives the output optical signal 112 from the optical resonator assembly 125 and the at least one OEC 135 converts the optical signal 112 into an electrical signal 114 that can be processed by the signal processing circuit 140 to produce a decoded information signal 116. The decoded information signal 116 may include the information that was encoded on the modulated optical signal 110 by the modulation of the modulated optical signal 110. The OEC 135 may include one or more photo-diodes, for example, or other components capable of transforming an optical signal into an electrical signal. The signal processing circuit 140 may include various components, as will be understood by those skilled in the art, such as analog-to-digital converters, filters, amplifiers, controllers, etc., to condition and process the electrical signals received from the detector assembly 130 to produce the decoded information signal 116. The optical receiver 100 may further include a controller 150 that may be coupled to the signal processing circuit 140 and to the optical resonator assembly 125 and configured to adjust parameters of the optical resonator assembly 125 to maintain a selected operating condition of the optical resonator assembly 125, as discussed in more detail below, so as to maintain alignment between the optical receiver 100 and a transmitting source of the modulated optical signal 110.

In certain examples, the optical resonator assembly 125 includes one or more optical resonators configured to convert the modulation of the modulated optical signal 110 into intensity modulation of the output optical signal 112. As noted above, the modulated optical signal 110 may be phase modulated, amplitude modulated, and/or frequency modulated. As used herein, the term "optical resonator" refers to a component capable of sensing variations, such as frequency variations, amplitude variations, or phase variations in the received optical signal 110. Examples of optical resonators may include Fabry-Perot etalons, micro-rings, Fizeau interferometers, Michelson Interferometers, or other types of optical resonators. Each optical resonator in the optical resonator assembly 125 converts the modulation of the arriving optical signal 110 in part by interaction of the arriving optical signal 110 with optical energy built-up in the resonator.

Operation of an optical resonator as a phase change detector is discussed below using the example of an etalon; however, those skilled in the art will appreciate that other types of optical resonators can be operated according to similar principles. Further, the optical resonator may respond similarly to amplitude modulated or frequency modulated input optical signals.

Figure 2:
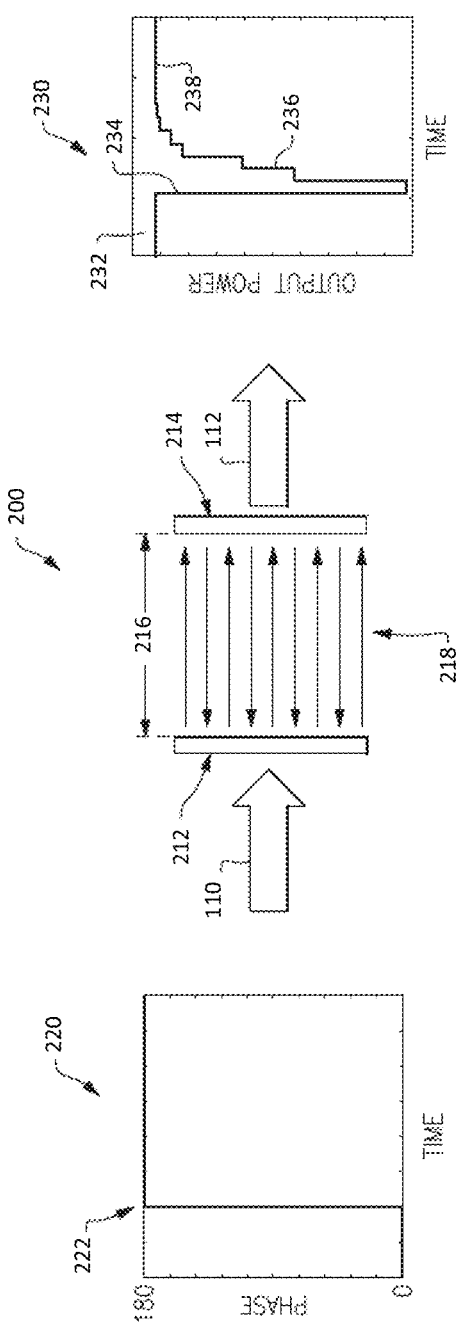
FIG. 2 is a diagram illustrating an example of operation of an etalon according to aspects of the present invention.

Referring to FIG. 2, in certain examples an etalon 200 is a component having a pair of parallel semi-reflective surfaces 212, 214 that may include an optically transparent material in between, and has a characteristic resonant frequency associated with a certain wavelength of light based upon the spacing (i.e., dimension 216) between the semi-reflective surfaces. The surfaces 212, 214 are semi-reflective and also semi-transmissive, in that they allow some light through, and therefore the arriving modulated optical signal 110 may be allowed into the etalon 200 and may resonate inside the etalon (i.e., in the interior 218 between the two semi-reflective surfaces 212, 214). Additionally, some of the light resonating inside is allowed out of the etalon 200 (through at least one of the semi-transmissive surfaces). Light emerging from the etalon 200 is shown, for example, as the output optical signal 112.

The optical signal 110 received by the etalon 200 establishes a steady-state energy-conserving condition in which optical signal energy continuously arrives at the etalon 200, adds to the built-up resonating energy existing inside the etalon 200, and emerges from the etalon 200 at a constant rate. If the frequency, amplitude, or phase of the arriving optical signal 110 changes, this change causes a temporary disruption to the resonance inside the etalon 200 and the light intensity emerging from the etalon 200 is also disrupted, until a steady state condition is re-established. Accordingly, a change in phase, frequency, or amplitude of the arriving optical signal 110 causes a change in intensity of the output optical signal 112. Thus, the etalon functions as a demodulator, or a modulation converter, for the optical signal 110. The output optical signal 112 may therefore carry the same information content as the arriving optical signal 110, but in an intensity modulated form, rather than a phase modulated form, for example.

FIG. 2 illustrates an example of the above-described operation of the etalon 200. FIG. 2 shows a graph 220 of the arriving modulated optical signal 110, showing a phase change in the optical signal 110. The graph 220 plots the phase (vertical axis) of the optical signal 110 over time (horizontal axis), showing a phase transition of pi (180 degrees) at point 222. FIG. 2 also shows a graph 230 of optical signal intensity (as output power) emerging from the etalon 200 during the phase transition in the received optical signal 110. At region 232 the etalon 200 is in a steady-state resonance condition wherein a steady intensity of light emerges. At point 234, corresponding to point 222 in the graph 220, a phase transition occurs in the arriving optical signal 110, temporarily disrupting the steady-state and causing a drop in the emerging light intensity. During successive reflections inside the etalon 200, and indicated region 236 in the graph 230, resonance is re-establishing, and the emerging light intensity increases until, at point 238, a steady intensity of light emerges when the etalon 200 has returned to a steady-state condition. Thus, variations in the intensity of the output optical signal 112 from the etalon 200 indicate that a transition occurred in the arriving optical signal 110, such as a phase transition due to phase modulation of the optical signal 110.

The etalon 200 may have varying levels of reflectivity of the semi-reflective surfaces 212, 214. In certain examples, the reflectivity may be expressed as a fraction of light amplitude reflected back into the interior 216 or may be expressed as a fraction of light intensity reflected back into the interior 216. The reflectivity of each of the first and second semi-reflective surfaces 212, 214 may be the same or different, and may be any suitable value for a particular implementation. The etalon 200 is one example of a suitable optical resonator in accord with aspects and embodiments described herein. However, the use of the term "etalon" throughout this disclosure is not intended to be limiting and as used herein may include any of multiple structures, including plates with reflecting surfaces as well as parallel mirrors with various materials in between, and may also be referred to as cavities, interferometers, and the like. Additionally, etalon structures may be formed as a laminate, layer, film, coating, or the like. In some examples, an etalon may include reflective surfaces (including semi-reflective surfaces) that are not co-planar and/or are not co-linear. For example, an interior reflective surface of an etalon may include some curvature, and an opposing surface may also be curved such that a distance between the two surfaces is substantially constant across various regions of the etalon, in some examples. In other examples, an etalon may have non-linear or non-planar surfaces with varying distances between the surfaces at various regions, and may still function as an optical resonator for various wavelengths and at various regions, suitable for use in examples discussed herein. Accordingly, an etalon may be purposefully designed to conform to a surface, or to have various regions responsive to differing wavelengths, or responsive to differing angles of arrival for a given wavelength, in certain examples. Additionally, other optical resonators, such as an optical loop or micro-ring, for example, may operate according to similar principles and also be used in the optical resonator assembly 125. For example, optical signal energy accumulated in the loop/micro-ring may constructively or destructively interfere with itself, at certain frequencies (wavelengths), and such constructive or destructive interaction may be disturbed by a phase change in an arriving optical signal 110. Accordingly, phase changes in the arriving optical signal 110 may be detected and interpreted to demodulate the arriving optical signal 110. In the example shown in FIG. 2, the output intensity/power from the etalon 200 exhibits a transient disturbance that is a temporary reduction in power; however, in other configurations the transient disturbance may instead be a temporary increase in response to a phase (or amplitude or frequency) transition occurring in the arriving modulated optical signal 110.

The optical resonator assembly 125 may include one or more etalons 200, or other types of optical resonators that operate similarly to convert the modulation of the arriving optical signal 110 into the intensity-modulated output optical signal 112 which may then be detected and processed to recover the information encoded in the original optical signal 110. As discussed above, in various examples, each optical resonator within the optical resonator assembly 125 may have one or more characteristic resonant frequencies (alternatively referred to as a characteristic resonant wavelength). When the frequency of the arriving optical signal 110 corresponds to the characteristic resonant frequency of the optical resonator, optical signal energy accumulates to build-up resonating optical signal energy inside that optical resonator, as discussed above, and the optical resonator is said to be operating in a resonant mode or condition. An optical resonator that is operating in a resonant mode may also be referred to as being "tuned" to the arriving optical signal 110. An optical resonator that is tuned to the frequency of the received optical signal 110 may output optical signal energy 112 of a higher intensity (e.g., amplitude) relative to one that is detuned. Accordingly, in certain examples, it may be desirable to maintain all or at least some of the optical resonators in the optical resonator assembly 125 operating in the resonant mode.

The resonance condition of the optical resonator depends on the wavelength, k, of the arriving optical signal 110 and the optical path length of the optical resonator. For example, referring again to FIG. 2, a tuned etalon 200 may have an interior dimension 216 that is selected such that the optical path length, L, (i.e., based upon the speed of light in the material of the interior 218) is an integer number of half-wavelengths, e.g., $L=n\lambda/2$, where n is a positive integer. The optical path length is also dependent on the angle of incidence of the arriving optical signal 110 because that angle determines the angle at which the optical signal 110 travels between the first and second semi-reflective surfaces 212, 214. For a given wavelength, the optical path length of the etalon 200 is shortest for normal incidence (as shown in FIG. 2), and increases as the angle of incidence of the optical signal 110 changes away from normal. For example, while the optical path length of the etalon 200 may be precisely $L=n\lambda/2$ for a selected "baseline" angle of incidence, a, of the optical signal 110, the optical path length changes to $L'=n\lambda/2\pm\Delta L$ when the angle of incidence changes (e.g., $\alpha'=\alpha\pm\Delta\alpha$), where $\Delta L$ is a function of $\Delta\alpha$. In some embodiments, $\Delta L$ is $\lambda/8$ and the optimum condition L' depends at least in part on the rate of change of the phase of the optical signal 110 where the response of the etalon 200 to the phase change is maximum. According to some embodiments, $\Delta L$ is non-zero, such that the intensity modulated output of the etalon 200 is at maximum. The dependence of the optical path length of the etalon on the angle of incidence or angle of arrival of the optical signal 110 in turn causes the tuning or resonance of the etalon 200 to be dependent on the angle of arrival of the optical signal 110. Thus, etalon 200 is sensitive to the angle of arrival of the incoming optical signal 110 and, in general, the response of the etalon 200, or intensity/amplitude of the output optical signal 112, changes as a function of that angle. Accordingly, aspects and embodiments provide a method for maintaining the resonance condition of the etalon 200, or other optical resonator used in the optical resonator assembly 125, as the angle of arrival of the incoming optical signal 110 changes. This in turn essentially maintains the operating condition of the optical receiver 100 over a range of angles, which is equivalent to maintaining "alignment" of the optical receiver 100 with a transmitting source of the optical signal 110.

Figure 3:
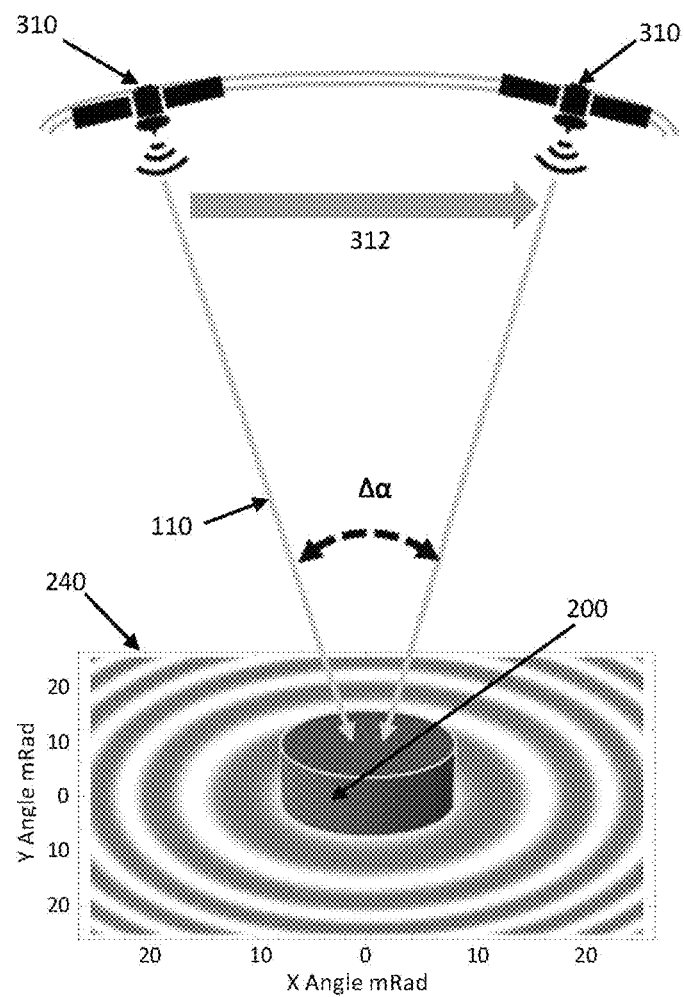
FIG. 3 is diagram illustrating an example of an optical receiver receiving an optical signal from a moving transmitter according to aspects of the present invention.

For example, referring to FIG. 3, a transmitter 310 may transmit the optical signal 110, which is received by an etalon 200 in the optical resonator assembly of the optical receiver, discussed above. As the transmitter 310 moves, as indicated by arrow 312, the angle of incidence, or angle of arrival, of the optical signal 110 at the etalon 200 correspondingly changes by an amount $\Delta\alpha$. The arriving optical signal 110 constructively or destructively interferes with itself and with the optical energy accumulated within the etalon 200 based on the resonant conditions of the etalon. FIG. 3 shows a representation of an interference pattern 240 produced at the etalon in response to receiving the optical signal 110. Light and dark regions in the interference pattern 240 indicate constructive interference (peaks) and destructive interference (valleys) fringes, respectively. In this example, the fringes are symmetric and form a circular pattern. For a given wavelength and optical path length, the pattern is static. As discussed above, however, the optical path length, L, of the etalon 200 (or other type of optical cavity) changes as the angle of incidence changes, and the etalon has a resonance structure that is periodic based on the optical path length. As a result, the resonant conditions (whether a particular optical frequency adds constructively or destructively after one roundtrip inside the etalon 200), change depending on the angle of arrival of the optical signal 110.

According to certain embodiments, a method is applied by which a given resonant condition of the etalon 200 can be maintained over a wide range of angles of arrival of the optical signal 110. In one embodiment, this may be accomplished by controlling the physical thickness (e.g., dimension 216) of the etalon 200, which in turn adjusts the optical path length. In this manner, the etalon 200 can be tuned to track a moving transmitter 310 and maintain a particular operating point (resonant condition) as the angle of incidence of the optical signal 110 changes. As noted above, the optical path length is also dependent on the wavelength of the arriving optical signal 110. In the process and examples discussed below, the wavelength of the arriving optical signal 110 is assumed to be constant, and the optical path length of the optical resonator is controlled to maintain or select a given resonance condition over a range of angles of incidence of the arriving optical signal 110. Those skilled in the art will appreciate, given the benefit of this disclosure, that the optical path length of the etalon 200 can be similarly adjusted to tune the etalon to a different wavelength.

Figure 4:
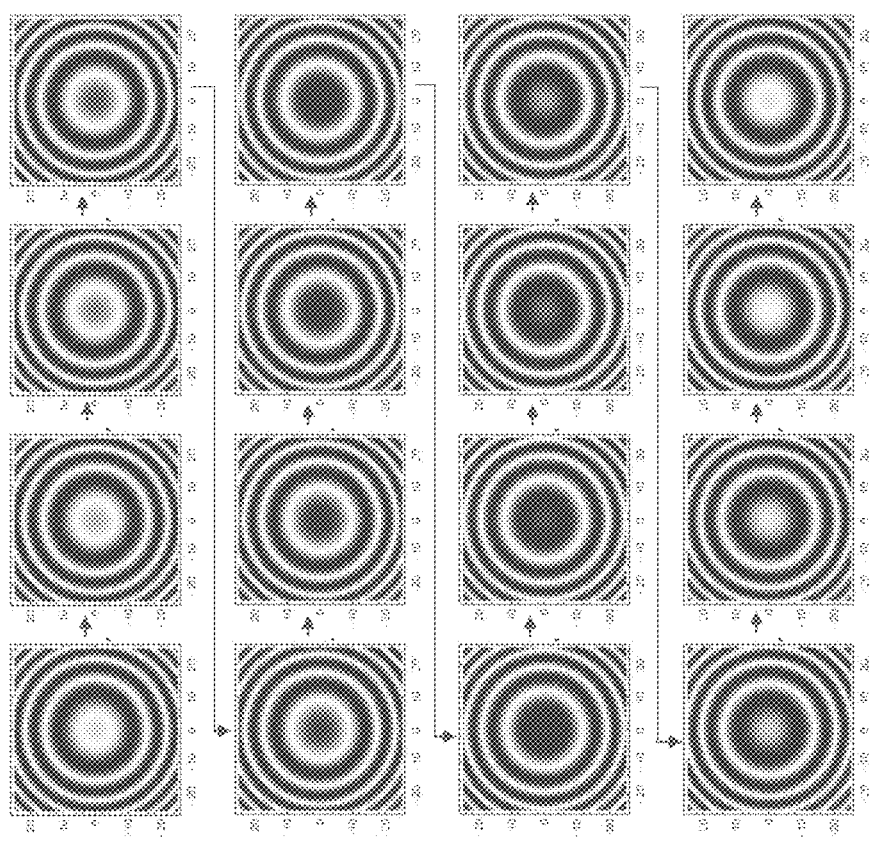
FIG. 4 is a series of diagrams illustrating an example of the changing interference pattern at an optical resonator as the optical path length of the resonator changes, in accord with aspects of the present invention.

According to certain embodiments, by changing the optical path length of the etalon 200, any resonant condition can be achieved at any incident angle of the optical signal 110 to maintain a given resonant condition. FIG. 4 shows the progression of fringes that result as the optical thickness (optical path length) of an example of the etalon 200 is changed. This change in thickness/length may correspond to movement of the transmitter 310 such that the angle of incidence of the optical signal 110 changes over the range Δα, as shown in FIG. 3. The location of maximum (or minimum) resonance transitions from one angular position of the arriving optical signal 110 to the next, eventually returning in appearance to the initial fringe pattern.

According to certain embodiments, a method is applied to dynamically adjust the physical dimension 216 of the etalon 200 to control the optical path length and to counteract the change in the optical path length that is caused by the changing angle of arrival of the optical signal 110. By tuning the thickness of the etalon 200, and therefore the optical path length, a desired resonant condition can be achieved and maintained as the incoming optical signal 110 moves from one angular orientation to another. In some embodiments, the physical dimension 216 of the etalon 200 is adjusted (i.e., increased or decreased) by mechanically actuating one or more of the semi-reflective surfaces 212, 214. For example, the controller 150 may provide a control signal to apply a voltage or current to one or more mechanical actuators connected to one or more of the semi-reflective surfaces 212, 214, causing the semi-reflective plates 212, 214 to move closer together or further apart, thereby changing the physical dimension 216 of the etalon 200. Similar operation may be achieved using another electrically actuatable material. In other embodiments, the physical dimension 216 of the etalon is adjusted by increasing or decreasing the temperature of the etalon 200. According to certain embodiments, a method is applied to dynamically adjust the optical path length within etalon 200 by changing an electric field within the etalon 200 to counteract the change in the optical path length that is caused by the changing angle of arrival of the optical signal 110. In some embodiments, the optical path length within the etalon 200 is changed by adjusting a voltage of one or more electrodes applied to an electro-optic material of the etalon 200. Adjusting the voltage changes the electric field within the etalon 200, thereby changing the index of refraction of the etalon 200 without changing the physical dimension 216 of the etalon 200.

FIGS. 5A-5D illustrate an example of how, as the angle of arrival of the incoming optical signal 110 changes, the fringes in the interference pattern 240 at the etalon 200 can be tuned to achieve to the same operating point. The optical path length tuning can be done in a variety of ways to reduce or eliminate the imparted momentum to the optical receiver 100 or platform on which the optical receiver is mounted, as discussed further below.

Figure 5A:
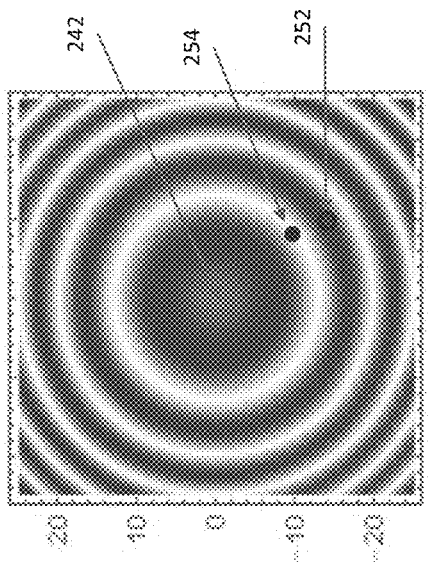
FIGS. 5A-5D are diagrams illustrating interference patterns at an optical resonator for optical signals received at different angles of incidence, in accord with aspects of the present invention.
Figure 5B:
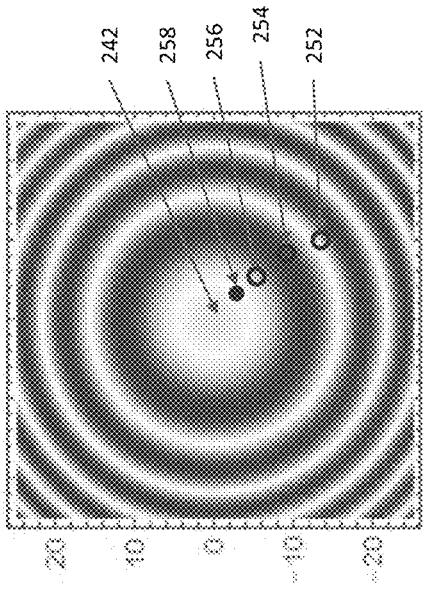
Figure 5C:
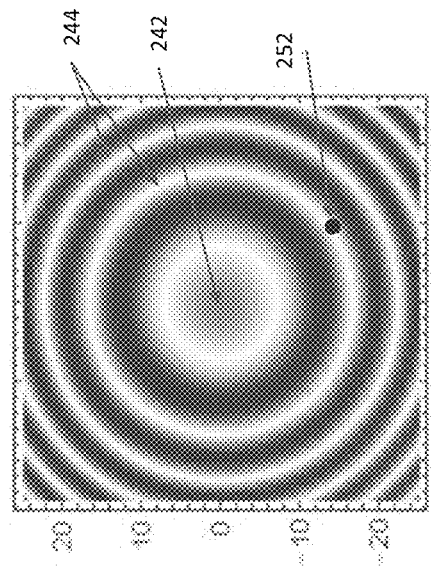
Figure 5D:
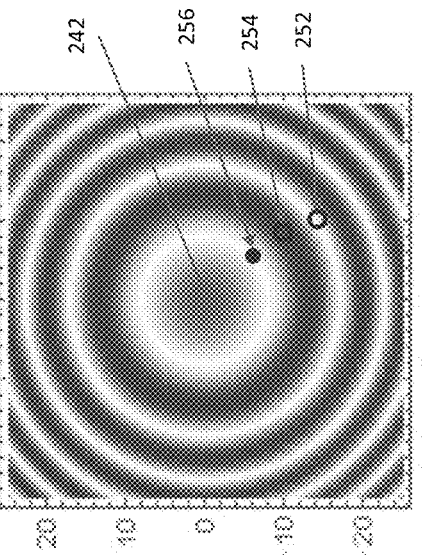

FIGS. 5A-5D show the interference pattern 240 as a function of angle in two dimensions (e.g., x and y; azimuth and elevation, etc.). The center-point 242 of the interference pattern corresponds to normal incidence of the arriving optical signal 110 on the etalon 200. FIG. 5A shows a first point 252 corresponding to a first angle of incidence of the arriving optical signal 110 (which may correspond to as first position of the transmitter 310). In this example, the etalon 200 is tuned such that the optical signal 110 arriving at this angle corresponds to the etalon 200 having a constructive interference resonant condition (i.e., as shown in FIG. 5A, the point 252 falls on a constructive interference fringe 244 of the interference pattern 240). FIG. 5B demonstrates that as the angle of incidence of the arriving optical signal 110 changes to a new point 244, the optical path length of the etalon 200 can be tuned such that the resonant condition of the etalon remains the same. As shown, point 254 again falls on a constructive interference fringe 244. The prior angle 252 is shown for reference. Similarly, FIGS. 5C and 5D show that as the angle of incidence of the arriving optical signal 110 continues to change, the etalon 200 can be tuned to maintain the same resonant condition. As shown, angular points 256 and 258 each fall on a constructive interference fringe 244. In this example, the angle of incidence of the optical signal 110 is shifting over a range, become successively closer to normal (points 254, 256, and 258 are sequentially closer to the center-point 242). Thus, as the angle of arrival of the optical signal changes (as representatively shown by points 252, 254, 256, 258), the interference pattern fringes can be tuned to the same operating point. Accordingly, by tuning the optical path length, the desired resonant condition can be both initially selected (i.e., place the point 252 on a constructive or destructive interference fringe) and then maintained as the transmitter 310 moves from one angular orientation to another. Certain examples may leverage the periodic nature of the interference fringes 244, thereby reducing the tuning requirements on the optical resonator to maintain the desired operating point. For example, provided that the optical resonator is tuned such that the angle of incidence of the incoming optical signal 110 falls on any constructive interference fringe 244, it may not be necessary to ensure that the different angles of incidence correspond to the same constructive interference fringe 244 or same location within the interference pattern 240.

The optical path length, or optical thickness, of the etalon 200, or other type of optical resonator, can be tuned in a variety of ways. For example, the a dynamically adjustable material, such as a piezoelectric material, for example, can be used in the interior 218 of the etalon 200 to allow for dynamic adjustment of the distance 216 between the two semi-reflective plates 212, 214 (e.g., under the control of the controller 150), thereby tuning the optical path length. For example, where the material in the interior 218 of the etalon 200 is a piezoelectric material, the controller 150 may provide a control signal to apply a voltage or current to the piezoelectric material to alter the thickness of the material, causing the semi-reflective plates 212, 214 to move closer together or further apart, thereby changing the optical thickness of the etalon 200. Similar operation may be achieved using another electrically actuatable material. In certain examples, the controller 150 and/or the signal processing circuit 140 may monitor the amplitude (or another characteristic) of the output optical signal 112 (either directly or through monitoring the electrical signal 114 output from the detector assembly 130) to determine the operating point of the optical resonator assembly 125, and the control circuit may responsively provide the control signal to tune one or more of the optical resonators in the optical resonator assembly 125 to maintain the desired operating point (e.g., desired resonant condition). Thus, the controller 150 may operate a feedback loop to control the optical resonator assembly 125 to maintain the desired operating point as the angle of arrival of the incoming optical signal 110 changes.

In certain examples, tuning the optical path length of the optical resonator(s) in the optical resonator assembly 125 to adjust to the different angular orientations of the transmitter 310, for example, by using a piezoelectric material, may advantageously allow the optical receiver 100 to maintain "alignment" with the transmitter 310 and track the incoming optical signal 110 over a large angular range without imparting momentum to the optical receiver 100 or to the platform on which the optical receiver may be mounted. This approach may improve the field of regard for an optical demodulator/receiver element without the need to rotate or mechanically translate the element. In addition, the tuning speed can be very fast, allowing for rapid, dynamic adjustment in response to movement of the transmitter 310. Thus, unlike conventional approaches, such as gimbaled systems or beam-steering mirrors, embodiments of the optical receiver 100 may track a moving transmitter as the angle of incidence of the optical signal from the transmitter changes without imparting momentum and with greater tuning speed. As discussed above, the optical resonator(s) can be tuned to maintain any desired operating point and, in addition, the operating point may be easily and quickly changed from signal to signal, for example, a result that is not achievable by conventional mechanical mechanisms.

Figure 6B:
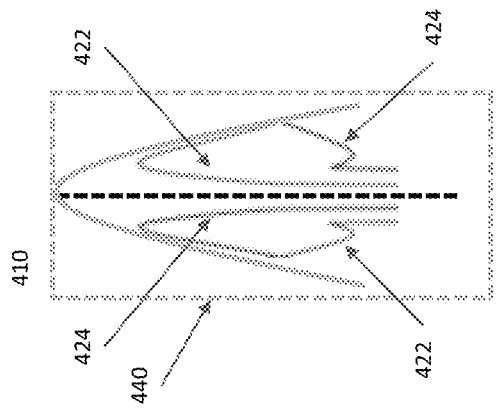
FIG. 6B is an enlarged view of a portion of a region of the graph of FIG. 6A.
Figure 6A:
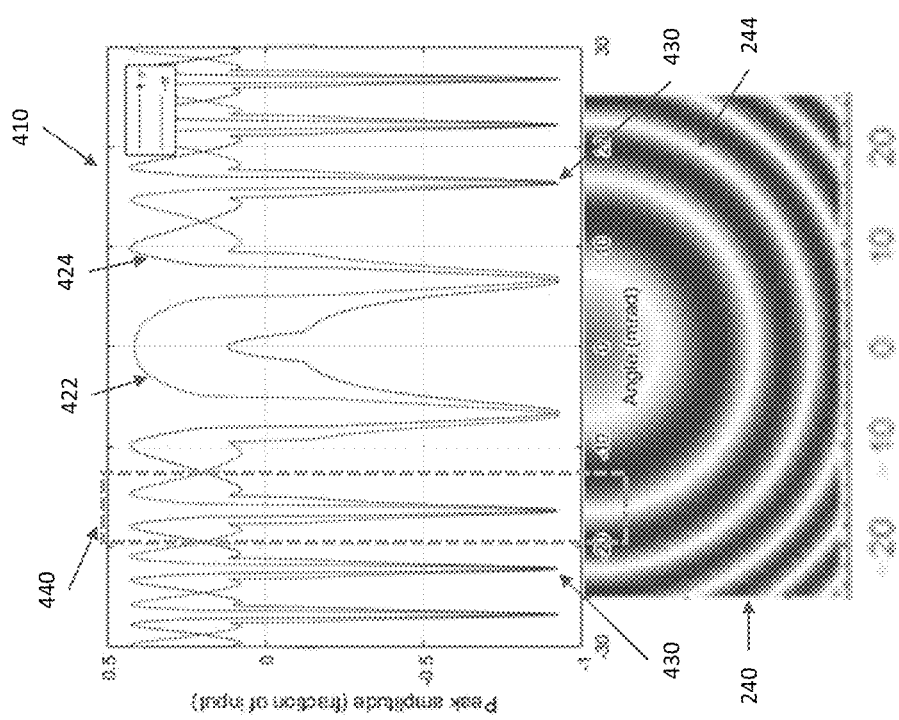
FIG. 6A is a diagram illustrating a plot of an example of the transmission characteristics for positive and negative phase changes for a given optical resonator, in accord with aspects of the present invention.

As discussed above, the optical resonator assembly 125 may operate with any type of modulated optical signal 110, including phase modulation, frequency modulation, amplitude modulation, or a combination thereof. However, certain embodiments may leverage characteristics associated with a phase modulation to resolve direction of travel ambiguity. FIG. 6A shows a plot of the transmission characteristics for positive and negative phase changes for a given optical resonator. More specifically, referring to FIG. 6A, there is illustrated a graph 410 of an example of the amplitude output optical signal 112 (as a fraction of the amplitude of the input optical signal 110) as a function of angle (the angle of incidence of the input optical signal 110) overlaid on an interference pattern 240 produced at the optical resonator. In this example, the input optical signal 110 is a phase modulated signal, and in the graph 410, trace 422 represents the output optical signal 112 responsive to a −Pi phase change in the input optical signal 110 and trace 424 represents the output optical signal 112 responsive to a +Pi phase change in the input optical signal 110. As shown, in both cases the sharp dips 430 (low output signal intensity) in the output optical signal 112 correspond to constructive interference fringes 244 in the interference pattern 240. FIG. 6B is an enlarged view of a portion of the region 440 on the graph 410. For a given amount of transmitted continuous-wave (CW) light in the optical signal 110, it may be unclear whether the angle of arrival of the optical signal 110 is on a positive or negative slope of a given interference fringe 244. This ambiguity can be removed using a phase modulated input optical signal 110. For example, referring to FIGS. 6A and 6B, it is clear that while there are two locations of equal optical power transmission on every fringe, the phase modulation eliminates the ambiguity in the pattern. Specifically, the deviation from steady state in the output optical signal 112 is different for a +Pi or a −Pi phase shift in the incoming optical signal 110 (compare traces 422 and 424). Thus, by using a phase modulated signal, the above-mentioned ambiguity can be removed by seeing the relative amplitudes of positive and negative phase changes of the incoming optical signal 110. Using a phase modulated input optical 110 may therefore allow for higher resolution tracking with reduced ambiguity.

FIG. 6A is an example plot of the transmitted peak response. Other plots similar to 6A and 6B can be generated based on the response of the etalon 200. In some embodiments, similar plots for the reflection characteristics for positive and negative phase changes for a given optical resonator are generated to remove ambiguity in the output signal 112. In some embodiments, the output signal 112 may be a transmitted signal, a reflected signal, or any other signal that results from the interaction of the input optical signal 110 with energy stored within an optical resonator, such as etalon 200. To create a tuning capability for a given optical resonator, a method is performed as follows. Utilizing the configuration of FIG. 2, any optical resonator, including etalon 200, may be used as a delay line. For example, the optical resonator is one of a Fabry-Perot resonator, a microring resonator, a Fizeau interferometer, and a Michelson interferometer. The delayed signal created by the delay line is combined with the received incoming optical signal 110, thereby combining an output of the resonator with a fraction of the received signal. The response to the change in phase in the incoming optical signal 110 for any signal interacting with the stored energy in the etalon 200 is calculated similar to that of graph 230 illustrated in FIG. 2. The dependence of the output amplitude signal on the angle of incidence is calculated in a manner similar to that illustrated in FIG. 6. Based on the calculated dependence of amplitude on the angle of incidence, the optical resonator is dynamically tuned according to any embodiment described herein to resolve direction of travel ambiguity.

For each optical resonator, the delay caused by energy storage within the resonator causes a reflected signal, transmitted signal, or any other signal interacting with stored energy in the resonator to have different characteristics for positive and negative phase changes in the incoming optical signal 110. In an example, a signal reflected from a front surface of the etalon 200 combines direct reflection from the front surface with the energy stored inside the etalon 200 which acts as a resonator. In another example, a signal transmitted through the etalon 200 combines energy directly transmitted through the etalon 200 with that stored in the etalon 200 which acts as a resonator. In still another example, signals transmitted and reflected from the etalon 200 are combined with each other using additional optics. In another example, a non-planar resonator is used (e.g., a Fizeau interferometer) and the output signal 112 combines directly transmitted light with that stored in the interferometer. In another example, a Michelson interferometer is used. Any delay line arrangement (which acts as a resonator) combines the current signal with that delayed by the delay line and will respond to a phase change in a manner similar to that in FIG. 2.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An optical receiver comprising:
   an optical resonator assembly including at least one optical resonator configured to receive an input optical signal, to accumulate resonant optical signal energy inside the at least one optical resonator based at least in part on the input optical signal, and to produce an intensity modulated output optical signal, an intensity modulation of the output optical signal being representative of a modulation of the input optical signal;
   a detector configured to detect the intensity modulated output optical signal and to identify the modulation of the input optical signal based at least in part on the intensity modulation of the output optical signal; and
   a controller coupled to the detector and to the optical resonator assembly, the controller being configured to provide a control signal to tune the at least one optical resonator to maintain a selected resonant condition of the at least one optical resonator over a range of angles of incidence of the input optical signal at the at least one optical resonator, and configured to provide the control signal to tune the at least one optical resonator to maintain the selected resonant condition of the at least one optical resonator as the angle of incidence of the input optical signal changes over the range of angles of incidence.

2. The optical receiver of claim 1, wherein the at least one optical resonator is one of a Fabry-Perot etalon, a micro-ring resonator, a Fizeau interferometer, and a Michelson interferometer.

3. The optical receiver of claim 1, wherein the at least one optical resonator includes:
   a first semi-reflective surface positioned to receive the input optical signal,
   a second semi-reflective surface positioned facing the first semi-reflective surface and arranged to emit the output optical signal; and
   a material interposed between the first semi-reflective surface and the second semi-reflective surface, the at least one optical resonator being configured to accumulate the resonant optical signal energy inside the at least one optical resonator and between the first semi-reflective surface and the second semi-reflective surface to approach a steady-state output value of the output optical signal, the intensity modulation of the output optical signal including a series of deviations from the steady-state output value.

4. The optical receiver of claim 3, wherein the material is a piezoelectric material, and wherein the controller is configured to apply the control signal to the piezoelectric material to tune an optical thickness of the at least one optical resonator.

5. The optical receiver of claim 1, wherein the modulation of the input optical signal is phase modulation.

6. The optical receiver of claim 5, wherein the controller is configured to monitor the output signal and to provide the control signal based on the detector identifying a deviation from steady state in the output optical signal as corresponding to a phase shift in the modulated input optical signal.

7. The optical receiver of claim 1, wherein the intensity modulated output optical signal is one or more of a transmitted signal or a reflected signal from the optical resonator.

8. The optical receiver of claim 1, wherein the at least one optical resonator is an etalon having a pair of semi-reflective surfaces configured to at least partially trap the resonant optical signal energy between the pair of semi-reflective surfaces by reflecting a portion of resonant optical signal energy between pair of semi-reflective surfaces, the etalon further including a material interposed between the pair of semi-reflective surfaces.

9. The optical receiver of claim 8, wherein the material is a piezoelectric material, and wherein the controller is configured to apply the control signal to the piezoelectric material to tune an optical thickness of the at least one optical resonator.

10. The optical receiver of claim 1, wherein the detector includes at least one optical-electrical converter configured to convert the output optical signal into an electrical signal.

11. The optical receiver of claim 10, wherein the controller is configured to monitor at least one of the output optical signal and the electrical signal and to provide the control signal based on a characteristic of the monitored signal.

12. A method of maintaining an operating point of an optical receiver, the method comprising:
    receiving a modulated input optical signal at an optical resonator;
    resonating optical signal energy within the optical resonator based at least in part on the input optical signal;
    emitting an output optical signal from the optical resonator, an intensity of the output optical signal being based at least in part on an intensity of accumulated resonant optical signal energy within the optical resonator;
    tuning the optical resonator, via a control signal, to maintain a selected resonant condition of the optical resonator over a range of angles of incidence of the input optical signal at the optical resonator; and
    providing the control signal to tune the optical resonator to maintain the selected resonant condition of the optical resonator as the angle of incidence of the input optical signal changes over the range of angles of incidence.

13. The method of claim 12, wherein the optical resonator is an etalon having a pair of semi-reflective surfaces configured to at least partially trap the resonant optical signal energy in a piezoelectric material disposed between the pair of semi-reflective surfaces by reflecting a portion of resonant optical signal energy between pair of semi-reflective surfaces, wherein tuning the optical resonator includes applying a control signal to the piezoelectric material to adjust an optical thickness of the optical resonator.

14. The method of claim 12, further comprising:

a variation in the input optical signal causing a disturbance in the intensity of the output optical signal, the variation in the input optical signal corresponding to a modulation of the input optical signal; and identifying the modulation of the input optical signal based at least in part on detecting the disturbance in the intensity of the output optical signal.

15. The method of claim 14, further comprising:

monitoring the intensity of the output optical signal and tuning the optical resonator based at least in part on the intensity of the output optical signal.

16. The method of claim 15, wherein the modulation of the input optical signal is phase modulation, and the selected resonance condition is maintained by tuning the optical resonator based on identifying a deviation from steady state in the monitored intensity of the output optical signal as corresponding to a phase shift in the modulated input optical signal.

17. The method of claim 12, wherein the tuning further comprises:

tuning an optical thickness of the optical resonator, wherein the optical thickness is tuned by mechanically moving one of a pair of reflective surfaces of the optical resonator or adjusting a temperature of the optical resonator.

18. The method of claim 12, wherein the optical resonator includes an electro-optical material connected to one or more electrodes, and the optical resonator is tuned by adjusting a voltage of the one or more electrodes to adjust an electric field within the optical resonator.

19. The method of claim 12, wherein the emitted optical output signal is one or more of a transmitted signal or a reflected signal from the optical resonator.

* * * * *